(12) United States Patent
Minaguchi et al.

(10) Patent No.: US 6,819,547 B2
(45) Date of Patent: Nov. 16, 2004

(54) HOUSING FOR ELECTRONIC APPARATUS HAVING OUTER WALL FORMED BY INJECTION MOLDING

(75) Inventors: Hiroyuki Minaguchi, Higashimatsuyama (JP); Nobuyasu Tajima, Ome (JP); Naohiro Yokoyama, Akishima (JP); Yasuyuki Suzuki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 308 days.

(21) Appl. No.: 10/082,709

(22) Filed: Feb. 25, 2002

(65) Prior Publication Data

US 2002/0126445 A1 Sep. 12, 2002

(30) Foreign Application Priority Data

Mar. 7, 2001 (JP) .......................................... 2001-063960

(51) Int. Cl.⁷ ................................................. G06F 1/16
(52) U.S. Cl. ........................ 361/680; 361/681; 361/807; 164/113; 164/119
(58) Field of Search .......................... 361/600, 679–683, 361/807–810; 164/113, 119

(56) References Cited

U.S. PATENT DOCUMENTS

| 4,694,881 | A | | 9/1987 | Busk |
|---|---|---|---|---|
| 4,694,882 | A | | 9/1987 | Busk |
| 5,040,589 | A | | 8/1991 | Bradley |
| 6,005,767 | A | | 12/1999 | Ku |
| 6,072,274 | A | * | 6/2000 | Jondrow ..................... 313/495 |
| 6,467,527 | B1 | * | 10/2002 | Kubota et al. .............. 164/113 |
| 6,675,865 | B1 | * | 1/2004 | Yoshida ....................... 164/113 |
| 2001/0003017 | A1 | * | 6/2001 | Hosoi et al. ................ 428/34.1 |
| 2002/0044410 | A1 | * | 4/2002 | Nakano et al. .............. 361/681 |

FOREIGN PATENT DOCUMENTS

| JP | CN1242273 A | 1/2000 |
|---|---|---|
| JP | 18048 | 1/2001 |
| JP | 2001-18048 | 1/2001 |

OTHER PUBLICATIONS

Yo Kojima, et al., Manufacturing Technologies and Applications of Magnesium Alloys, High Technology Information, pp. 45–55.

* cited by examiner

Primary Examiner—Darren Schuberg
Assistant Examiner—Anthony Q. Edwards
(74) Attorney, Agent, or Firm—Pillsbury Winthrop LLP (57) ABSTRACT

The housing used in the electronic apparatus has an outer wall. The outer wall is formed by injecting a metal material from a plurality of gates into a molding space in a metal die. The outer wall includes a first end portion situated on an upstream end along a flowing direction of the metal material, a second end portion situated on a downstream end of the flowing direction of the metal material, and an injection portion formed on the first end portion where the plurality of gates of the metal die are situated, forming a space between the first end portion and the injection portion.

12 Claims, 6 Drawing Sheets

HOUSING FOR ELECTRONIC APPARATUS HAVING OUTER WALL FORMED BY INJECTION MOLDING

CROSS-REFERENCE TO RELATED APPLICATIONS

This application is based upon and claims the benefit of priority from prior Japanese Patent Application No. 2001-063960, filed Mar. 7, 2001.

BACKGROUND OF THE INVENTION

1. Field of the Invention

The present invention relates to a housing used for an electric apparatus, such as a portable computer, and more specifically, to such a structure that provides for thinner housings.

2. Description of the Related Art

An important factor for raising the commercial value of an electronic apparatus, such as a portable computer, is that it is compact and has excellent portability. Therefore, with regard to the housing enclosing various types of electronic devices, such as a hard disk drive device and a liquid crystal display panel, it is desired that the thickness of the housing be reduced as much as possible while maintaining the strength, rigidity and appearance of the apparatus.

In order to achieve the above, a magnesium alloy having a low relative density is conventionally used as the housing for portable computers. The conventional housing is made by a so-called thixo molding method, in which a magnesium alloy maintained at a half-melt state is injected into the molding space within a metal die. As compared to a housing made of synthetic resin, a magnesium-alloy equivalent can be formed with half or less the thickness of the synthetic resin. Accordingly, the overall weight of the housing can be reduced to that of an equivalent or less, in which a synthetic resin material is used.

In the case where a housing is formed by a thixo injection molding method, it is inevitable that as the thickness of the housing decreases, the mold space of the metal die is narrowed. Therefore, when injecting a magnesium alloy into the mold space, a high resistance is imparted to the magnesium alloy flowing in the mold space, and therefore the fluidity of the magnesium alloy is deteriorated.

In general, a magnesium alloy is injected into a mold space from one end thereof until it overflows from another end situated on the opposite side to the above one end, and thus the mold space is filled with the alloy. If the fluidity of the magnesium alloy within the mold space is poor, it is possible that the magnesium alloy cannot fully fill the entire mold space in the case of an A4-sized area, which is larger than, for example, a B5-sized area, even though no errors occur in a B5-sized area case in the mold space thereof. More specifically, magnesium alloy has a high thermal conductivity; therefore it is easily affected by the temperature of the metal die. Therefore, as the distance from one end of the mold space to the other end is increased due to the increase in the size of the mold space, the temperature of the magnesium alloy decreases as it reaches the other end of the mold space. As a result, the fluidity of the magnesium alloy is deteriorated at the other end of the mold space, thereby creating a magnesium-alloy unfilled region in this other end of the mold space.

Therefore, as the housing to be formed becomes thinner and larger in area, molding failures may frequently occur. As a result, the production yield is decreased, and the productivity and quality are adversely affected. At the same time, the production costs for the housing are undesirably increased.

BRIEF SUMMARY OF THE INVENTION

The present invention has been achieved under the above-described circumstances, and the object thereof is to provide a high-quality housing, the productivity of which can be increased by suppressing the occurrence of mold errors and therefore the production cost of which is decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to drawings in which the present invention is applied to portable computers.

Figure 1:
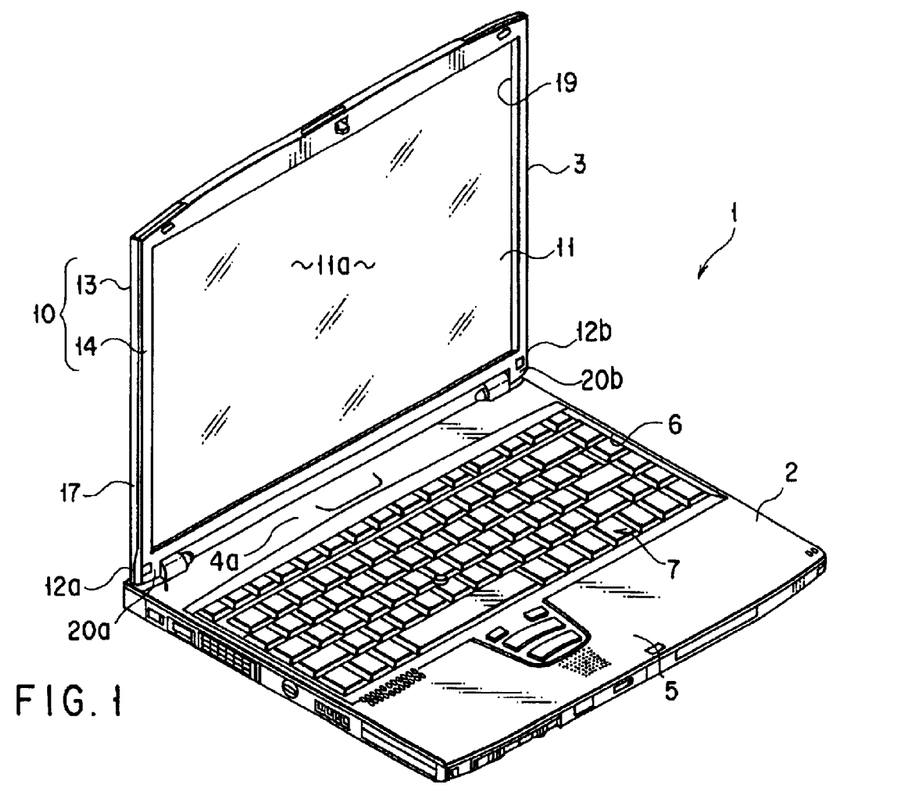
FIG. 1 is a perspective view showing a portable computer according to an embodiment of the present invention in a state where the display unit is rotated to an open position.
Figure 2:
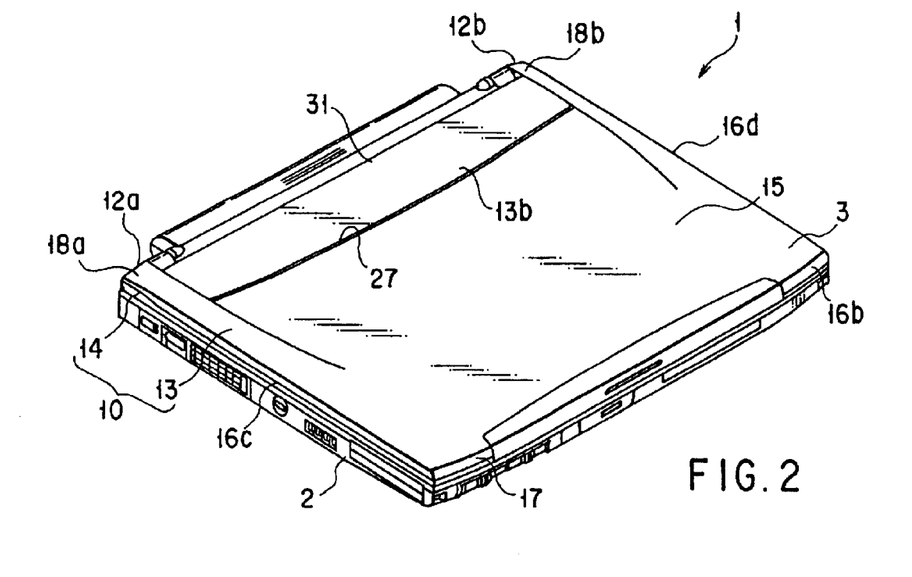
FIG. 2 is a perspective view showing the portable computer in a state where the display unit is rotated to a closed position.
Figure 3:
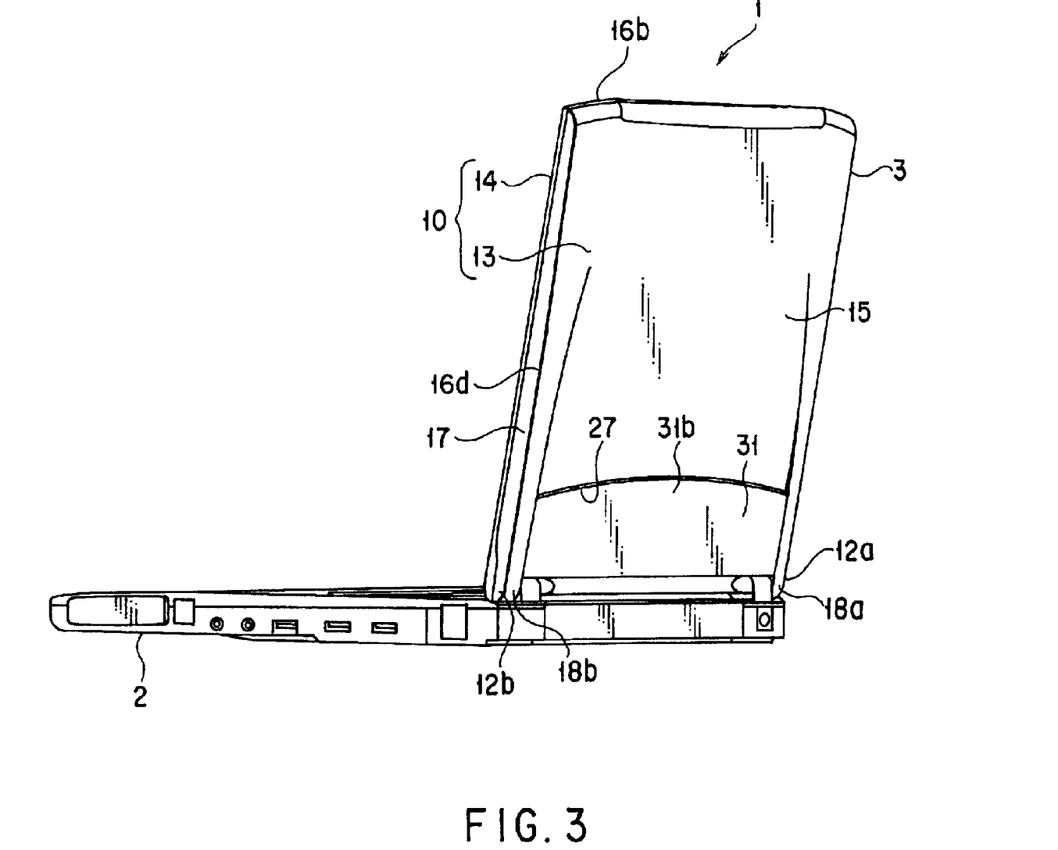
FIG. 3 is a perspective view showing the portable computer from its back, in a state where the display unit is rotated to an open position.

FIGS. 1 to 3 disclose a portable computer 1 as an electronic apparatus. The portable computer 1 includes a computer main body 2, and a display unit 3 supported by the computer main body 2.

The computer main body 2 has a flat box shape having a flat upper wall 4a. The upper wall 4a of the computer main body 2 includes a palm rest 5 and a keyboard mount portion 6. The palm rest 5 is situated at a front half section of the computer main body 2. The keyboard mount portion 6 is situated on the back of the palm rest 5. A keyboard 7 is provided in the keyboard mount portion 6.

The display unit 3 includes a display housing 10 and a liquid crystal display panel 11 as the functional part. The display housing 10 has a pair of leg portions 12a and 12b at one end. The leg portions 12a and 12b are provided to be apart from each other in the width direction of the display housing 10, and they are extended from the display housing 10 towards the rear end portion of the upper wall 4a of the computer main body 2.

Figure 5:
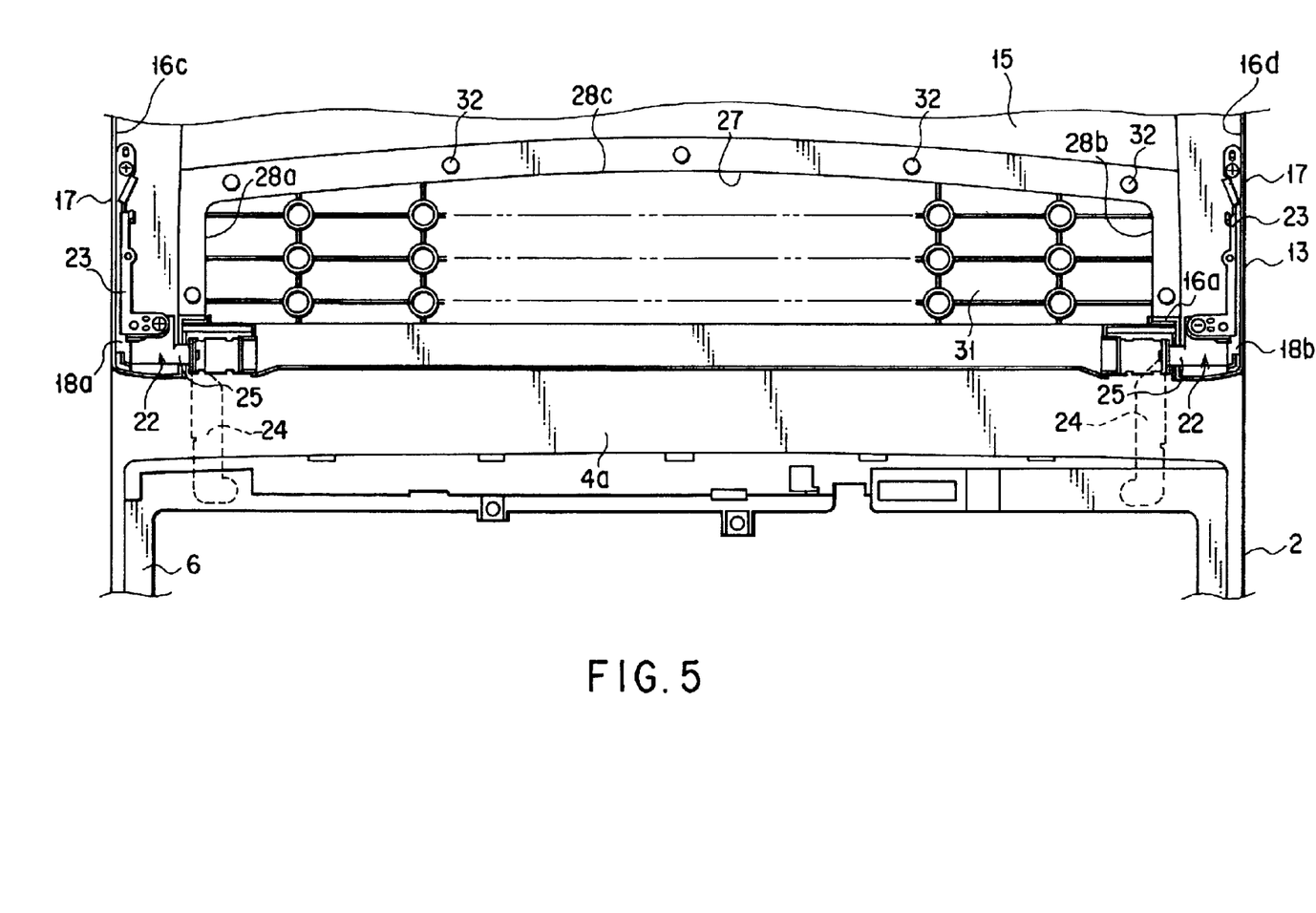
FIG. 5 is a plan view showing the portable computer, illustrating the positions of the upper wall of the computer main body, the display cover and the hinge devices.
Figure 6:
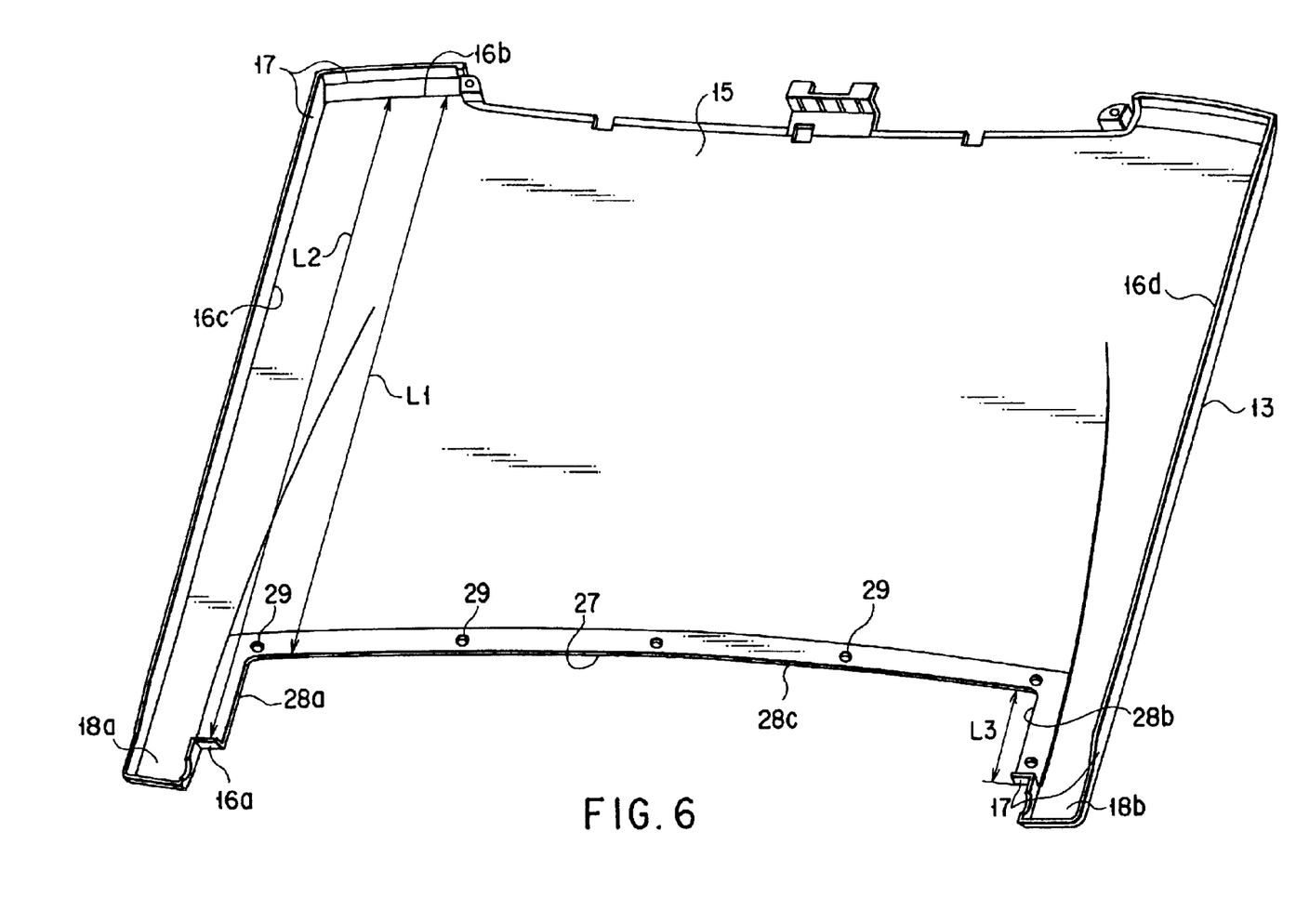
FIG. 6 is a perspective view of the display cover.

The display housing 10 includes a display cover 13 and a display mask 14. The display cover 13 and the display mask 14 are arranged to abut on each other. The display cover 13 is made of, for example, a magnesium alloy. The display cover 13 includes a support wall 15 serving as an outer wall. The support wall 15 has a rectangular shape larger than that of the liquid crystal display panel 11. As shown in FIGS. 5 and 6, the support wall 15 includes a lower edge portion 16a serving as the first end portion, an upper edge portion 16b serving as the second end portion, and side edge portions 16c and 16d on both right and left sides. The lower edge portion 16a and the upper edge portion 16b are provided to be apart from each other in the height direction of the display cover 13, and they are extended in the width direction of the display cover 13. The side edge portions 16c and 16d are provided to be apart from each other in the width direction of the display cover 13, and they are extended in the height direction of the display cover 13 over the lower edge portion 16a and the upper edge portion 16b. Further, the support wall 15 includes a circumferential wall 17 rising from each of the edge portions 16a to 16d.

The liquid crystal display panel 11 is housed between the display cover 13 and the display mask 14. The liquid crystal display panel 11 is situated in a region surrounded by the edge portions 16a to 16d of the support wall 15, and it is fixed onto the inner surface of the support wall 15 by a plurality of screws.

The support wall 15 has a pair of projecting portions 18a and 18b. The projecting portions 18a and 18b extend from corner portions each defined by the lower edge portion 16a of the support wall 15 and the side edge portions 16c and 16d. The projecting portions 18a and 18b are arranged to be apart from each other in the width direction of the display cover 13.

The display mask 14 is made of a synthesized resin material such as polycarbonate resin. The display mask 14 has an opening portion 19 exposing a display screen 11a of the liquid crystal display panel 11. The display mask 14 includes cover portions 20a and 20b which abut on the projecting portions 18a and 18b, respectively. The cover portions 20a and 20b operate together with the projecting portions 18a and 18b to function as the leg portions 12a and 12b.

FIG. 5 is a diagram showing a plan view of the display cover 13 in a state where the display mask 14 and the liquid crystal display panel 11 are removed. As can be seen from this figure, the display housing 10 is jointed to the upper wall 4a of the computer main body 2 via a pair of hinge devices 22. Each of the hinge devices 22 includes a first bracket 23, a second bracket 24 and a hinge shaft 25. The first bracket 23 is fixed to a side portion of the support wall 15 of the display cover 13. An end portion of the first bracket 23 is guided into the projecting portions 18a and 18b.

The second bracket 24 is fixed to the rear surface of the upper wall 4a of the computer main body 2 by screws. An end of the second bracket 24 is put through the upper wall 4a, and then guided between the leg portions 12a and 12b of the display housing 10. The second bracket 24 is placed adjacent to the first bracket 23.

The hinge shaft 25 is bridged between the first bracket 23 and the second bracket 24. The hinge shaft 25 extends horizontally along the width direction of the display housing 10, and is put through the side surfaces of the leg portions 12a and 12b of the display housing 12. An end of the hinge shaft 25 is fixed to the first bracket 23 by screws, and the other end of the hinge shaft 25 is connected rotatably to the second bracket 24.

With the above-described structure, the display housing 10 is set rotatable between a closed position and an open position back and forth around the hinge shaft 25 serving as a fulcrum. When the display housing 10 is rotated to the closed position as shown in FIG. 2, the display housing 10 is placed on top of the upper wall 4a of the computer main body 2 to entirely cover the palm rest 5 and the keyboard 7. On the other hand, when the display housing 10 is rotated to the open position as shown in FIG. 1 or 3, the display housing 10 is stood up with respect to the computer main body 2, and the palm rest 5, the keyboard 7 and the display screen 11a are exposed.

As best shown in FIG. 6, the support wall 15 of the display cover 13 includes a metal injection portion 27. The metal injection portion 27 has such a shape that the support wall 15 is cut away from the lower edge portion 16a thereof to the upper edge portion 16b, and it extends between the projecting portions 18a and 18b of the support wall 15 in the width direction of the display cover 13.

The metal injection portion 27 includes first to third edge portions 28a to 28c. The first and second edge portions 28a and 28b extend from the lower edge portion 16a of the support wall 15 towards the upper edge portion 16b, and they oppose each other in the width direction of the display cover 13. The third edge portion 28c extends in the width direction of the display cover 13 to bridge between the first edge portion 28a and the second edge portion 28b, and it is slanted towards the upper edge portion 16b rather than the lower edge portion 16a of the support wall 15.

With the above-described structure, as shown in FIG. 6, the distance L1 from the third edge portion 28c of the metal injection portion 27 to the upper edge portion 16b of the support wall 15 is shorter than the distance L2 from the lower edge portion 16a of the support wall 15 to the upper edge portion 16b. The difference between the distances L1 and L2 is equivalent a length L3 of the first and second edge portions 28a and 28b.

Further, the support wall 15 has a plurality of pores 29 around the metal injection portion 27. The pores 29 are arranged at intervals between each other along the first to third edge portions 28a and 28c.

Figure 4:
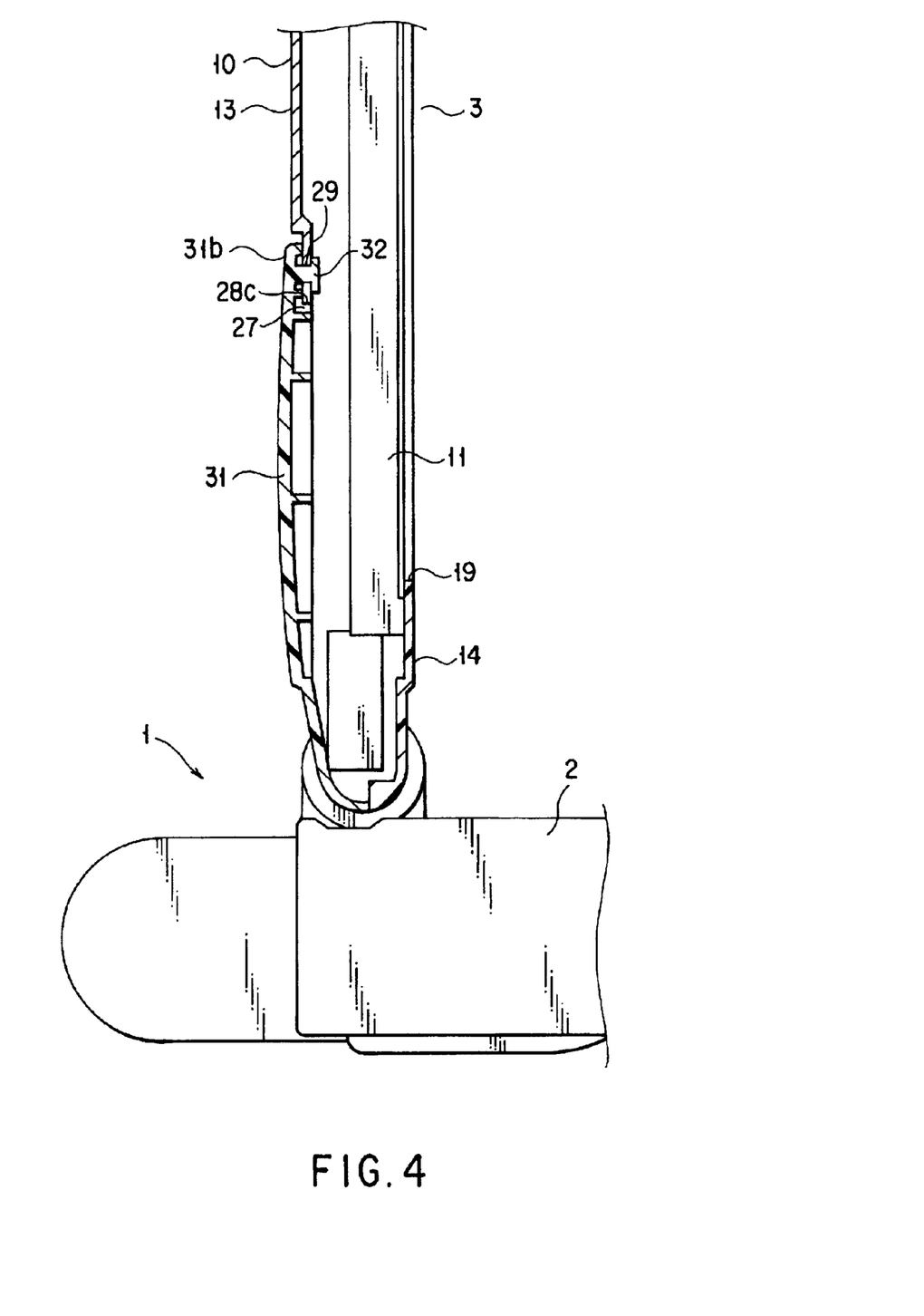
FIG. 4 is a side view showing the portable computer, illustrating the positions of the display housing and cover in relation to each other.

As shown in FIGS. 3 to 5, the metal injection portion 27 of the support wall 15 is covered by a cover 31 made of a synthetic resin. The cover 31 has a peripheral portion 31b along the first to third edge portions 28a to 28c of the metal injection portion 27. The peripheral portion 31b is put on top of the outer surface of the support wall 15. Therefore a plurality of projections 32 are formed to be integral with the periphery portion 31b of the cover 31. The projections 32 are inserted into the pores 29 respectively, and the distal ends of these projections 32 are heated and crushed, thereby fixing the cover 31 to the support wall 15. With this structure, the first to third edge portions 28a to 28c of the metal injection portion 27 are connected together by the cover 31. In this manner, the cover 31 reinforces the section of the support wall 15, which corresponds to the metal injection portion 27.

Figure 7:
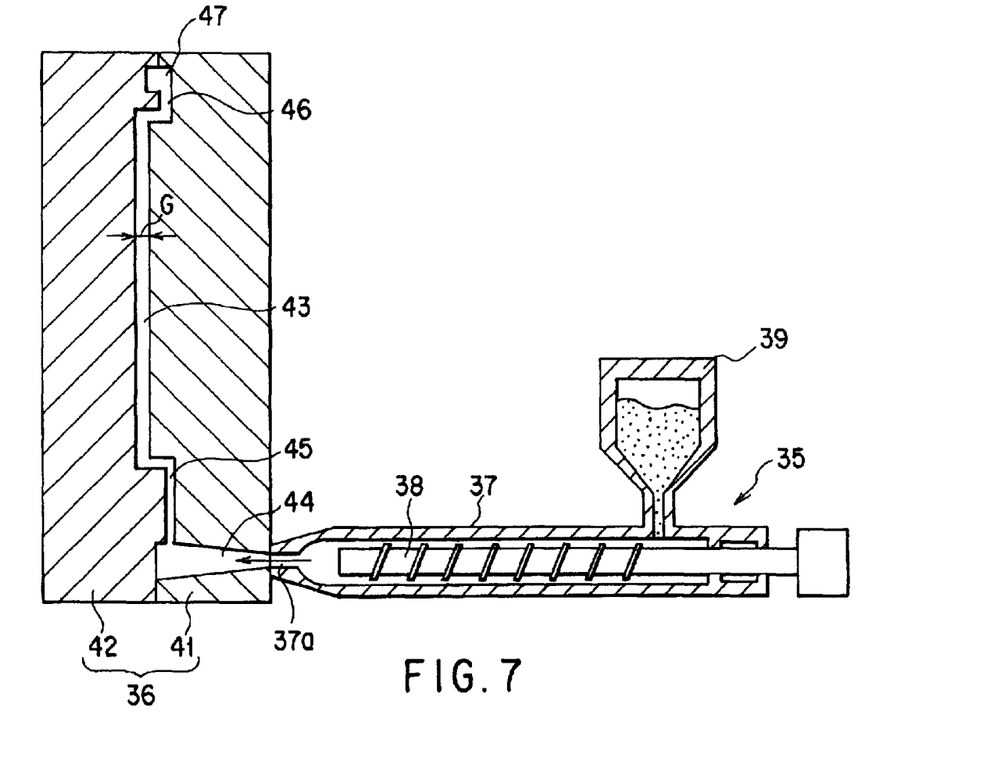
FIG. 7 is a cross-sectional view of a metal die and an injection molding device, used to form a display cover by injection molding.

The display cover 13 is molded by injection using the thixo mold method. In this injection molding, an injection molding device 35 and a metal die 36 as shown in FIG. 7 are used. The injection molding device 35 includes a cylinder 37 and a screw 38 disposed within the cylinder 37. The cylinder 37 has a hopper 39, from which magnesium-alloy-made pellets are put into the cylinder 37. The magnesium alloy is heated to a preset temperature within the cylinder 37, and is transformed into a half-molten state. The screw 38 is rotated in the shaft rotating direction within the cylinder 37. Due to this rotation, the magnesium alloy in a half-molten is transferred towards an ejection outlet 37a located at the tip end of the cylinder 37, and then pressurized by the screw 38.

In the thixo mold method, the thixotropy of the magnesium alloy is utilized. In the magnesium alloy in a solid-fluid co-present state, dendrites, which are in a solid phase, are usually formed in a branch-like manner. Therefore, in this state, the viscosity of the alloy is high. As the screw 38 is rotated and a shear force is applied to the magnesium alloy in a half-molten state, the dendrites are cut up finely into grains. As a result, the flowability of the magnesium alloy is increased, and injected from the injection outlet 37a of the cylinder 37.

The metal die 36 includes a first die 41 and a second die 42. When the first and second dies 41 and 42 are put together, a molding space 43 is made inside the metal die 36. The molding space 43 has such a shape that corresponds to the display cover 13 to be injected. In reply to the necessity of reducing the thickness of the display 13, a gap G of the molding space 43 is made very narrow.

The metal die 36 has an injection inlet 44 and a plurality of gates 45. The injection inlet 44 is communicated to the injection outlet 37a of the cylinder 37, and the half-molten magnesium alloy is supplied via the injection outlet 37a. The gates 45 are designed to uniformly disperse the magnesium alloy supplied to the injection inlet 44, within the molding space 43. The gates 45 are provided at sites which correspond to the metal injection portion 27 of the support wall 15 as indicated by arrows in FIG. 8. These gates 45 are aligned at intervals such as to be along with the first to third edge portions 28a to 28c of the metal injection portion 27.

Further, the metal die 36 includes a plurality of air vents 46 and molten metal reservoirs 47. The air vents 46 and molten metal reservoirs 47 are situated on opposite sides to the gates 45 with respect to the molding space 43 as being interposed therebetween. The air vents 46 are designed to release the air inside the molding space 43 to the outside, and they are situated at positions corresponding to the upper edge portion 16b of the support wall 15. The molten metal reservoirs 47 are communicated to the air vents 46 at a position outside the molding space 43.

Next, the procedure of forming the display cover 13 by the injection molding will now be described.

First, magnesium-alloy pellets are put into the cylinder 37 from the hopper 39 and heated. Thus, the magnesium alloy pellets are transformed into a half-molten state. The magnesium alloy causes a thixotropy phenomenon by the shearing force of the rotating screw 38, thereby increasing the fluidity. Therefore, the half-molten magnesium alloy is injected from the injection outlet 37a of the cylinder 37 into the injection inlet 44 of the metal die 36.

Figure 8:
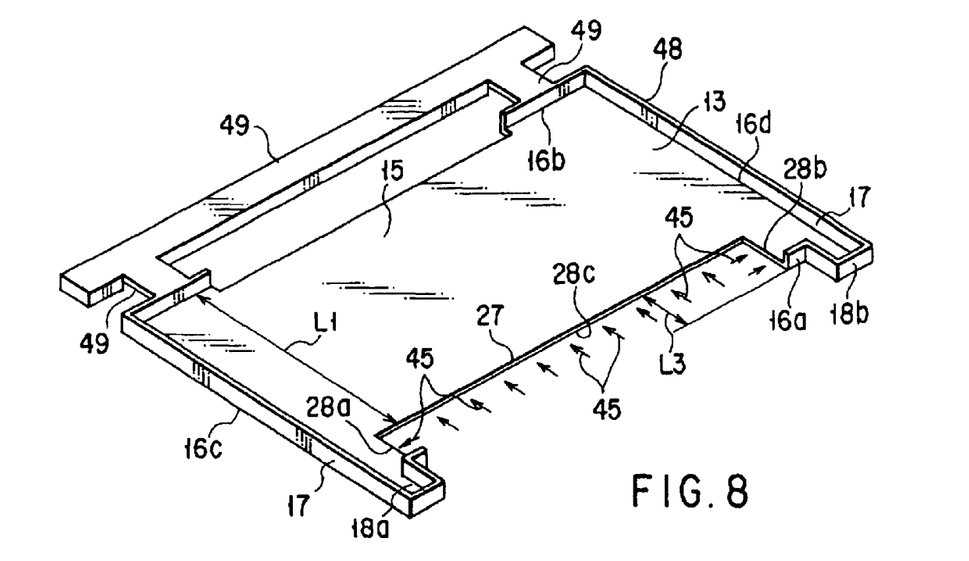
FIG. 8 is a perspective view schematically showing the shape of a product formed by the injection molding.

The magnesium alloy is injected forcibly into the molding space 43 via the gates 45, and after passing through the molding space 43, the alloy overflows from the air vents 46 to the molten metal reservoirs 47. Thus, the magnesium alloy is filled within the molding space 43 without creating voids, and then it solidifies in the molding space 43. As a result, an injection mold product 48 as shown in FIG. 8 is formed.

The injection mold product 48 is taken out of the metal die 36, and then several unnecessary structures 49 of the product at this stage, which correspond to the inlet 44, the gates 45, the air vents 46 and the molten metal reservoirs 47, are removed by machining. Thus, a series of injection molding steps for the display cover 13 are finished.

The display cover 13 made by the injection molding as described above, has the metal injection portion 27 in the lower edge portion 16a of the support wall 15, where the gates 45 of the metal die 36 are situated. With this structure, the magnesium alloy injected from the gates 45 into the molding space 43 flows towards the upper edge portion 16b from a position corresponding to the lower edge portion 16a of the support wall 15. Therefore, the lower edge portion 16a of the support wall 15 is located on an upstream end along the flowing direction of the magnesium alloy, whereas the upper edge portion 16b of the support wall 15 is located on a downstream end along the flowing direction of the magnesium alloy.

The metal injection portion 27 of the support wall 15 has such a shape that is cut away from the lower edge portion 16a towards the upper edge portion 16b. With this structure, the distance L1 from each gate 45 to the upper edge portion 16b of the support wall 15 becomes short by a portion corresponding to the length L3 of the first and second edge portions 28a and 28b of the metal injection portion 27.

In this manner, the distance of the flow of the magnesium alloy within the mold space 43 can be decreased, and therefore even if the molding space 43 is narrowed in compliance with the demand of the thinning of the display cover 13, the fluidity of the magnesium alloy can be kept at a high level.

Moreover, the metal injection portion 27 where the gates 45 are situated has the first and second edge portions 28a and 28b extending in the height direction of the display cover 13 and the third edge portion 28c extending in the width direction of the display cover 13. With this structure, the gates 45 can be arranged in line along the height and width directions of the support wall 15, and therefore the magnesium alloy injection region in the molding space 43 can be expanded.

Thus, it is possible to completely fill the molding space 43 at a high density with the magnesium alloy, and no magnesium-alloy unfilled regions are created in the molding space 43. In this way, the occurrence of defective products can be suppressed and accordingly the productivity can be increased. Therefore, it is possible to obtain a high-quality display cover 13 with a quality appearance of metal while satisfying the demand of the thinning of the display cover 13.

Further, a synthetic resin-made cover 31 which covers the metal injection portion 27 is fixed to the support wall 15 of the display cover 13. With this cover 31, it is possible to reinforce the structure around the metal injection portion 27 of the support wall 15. With this structure, even if some external force is applied to twist the side portion of the support wall 15 and the projections 18a and 18b, on which the first bracket 23 of the hinge device 22 is fixed, while rotating the display housing 10 to the closed portion or open position, the structure can fully withstand such an external force.

Therefore, regardless of such a structure that the support wall 15 of the display cover 13 is cut away at sections adjacent to the hinge device 22, the deformation or breakage of the support wall 15, which occurs while rotating the display housing 10, can be prevented. Further, with this structure, the display housing 10 can be smoothly rotated, and therefore the operability of the apparatus while opening/closing the display unit 3 is excellent.

It should be noted that in the above-described embodiment, the display cover of the display unit is formed by injection molding; however the present invention is not limited to this embodiment, but it is possible that the computer main body itself is made by injection molding.

Further, the metal material to be injected into the molding space in the metal die is not limited to magnesium alloy, but it may be some other metal, such as an aluminum alloy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A housing configured to house a functional part, comprising:

a support wall configured to support the functional part, and formed by injecting a metal material from a plurality of gates into a molding space in a metal die, wherein said support wall includes a first end portion situated on an upstream end along a flowing direction of the metal material, a second end portion situated on a downstream end of the flowing direction of the metal material, and an injection portion formed on the first end portion where said plurality of gates of the metal die are situated, forming a space between the first end portion and the injection portion, said injection portion includes first and second edge portions that extend from the first end portion towards the second end portion and facing each other and a third edge portion bridged between a distal end of the first end portion and a distal end of the second edge portion; and a synthetic-resin made cover configured to cover the injection portion of the support wall, the cover being fixed to the support wall by a plurality of locations along the first edge portion to the third edge portion of the injection portion.

2. A housing according to claim 1, wherein the functional part is situated between the first end portion and the second end portion of the support wall.

3. A housing according to claim 1, wherein the metal material is a magnesium alloy and is injected in a half-molten state into the molding space of the metal die.

4. A housing, comprising:

a support wall configured to support a functional part;

a pair of projecting portions projecting from the support wall at intervals, wherein, said support wall is formed by injecting a metal material from a plurality of gates into a molding space in a metal die, and said support wall includes a first end portion on which the projecting portions are situated, a second end portion situated on an opposite side to the first end portion, and an injection portion formed on the first end portion where said plurality of gates of the metal die are situated, forming a space between the first end portion and the injection portion; and a synthetic-resin made cover configured to cover the injection portion of the support wall, the cover being fixed to the support wall and situated between the projecting portions.

5. A housing according to claim 4, wherein the first end portion of the support wall is situated on an upstream end along a flowing direction of the metal material, and the second end portion of the support wall is situated on a downstream end of the flowing direction of the metal material.

6. A housing according to claim 5, wherein the functional part is situated between the first end portion and the second end portion of the support wall.

7. An electronic apparatus, comprising:

a housing configured to house a functional part, and formed by injecting a metal material from a plurality of gates into a molding space in a metal die, wherein said housing includes a first end portion situated on an upstream end along a flowing direction of the metal material, a second end portion situated on a downstream end of the flowing direction of the metal material, and an injection portion formed on the first end portion where said plurality of gates of the metal die are situated, forming a space between the first end portion and the injection portion; and a synthetic-resin made cover configured to cover the injection portion of the housing, the cover being fixed to the housing.

8. A display unit, comprising:

a support wall formed by injecting a metal material from a plurality of gates into a molding space in a metal die, wherein said support wall includes a first end portion situated on an upstream end along a flowing direction of the metal material, a second end portion situated on a downstream end of the flowing direction of the metal material, and an injection portion formed on the first end portion where said plurality of gates of the metal die are situated, forming a space between the first end portion and the injection portion, said injection portion includes first and second edge portions that extend from the first end portion towards the second end portion and facing each other, and a third edge portion bridged between a distal end of the first edge portion and a distal end of the second edge portion;

a display panel situated between the first end portion and the second end portion of the support wall; and a synthetic-resin made cover configured to cover the injection portion of the support wall, the cover being fixed to the support wall by a plurality of locations along the first edge portion to the first edge portion of the injection portion.

9. A display unit according to claim 8, wherein the metal material is a magnesium alloy and is injected in a half-molten state into the molding space of the metal die.

10. A display unit according to claim 8, wherein the display panel is a liquid crystal display panel.

11. A method of forming a housing for an electronic apparatus, comprising:

providing a metal material to form a support wall of the housing;

heating the metal material into a half-molten state;

injecting the metal material from a plurality of gates into a molding space in a metal die; and forming said support wall having a first end portion situated on an upstream end along a flowing direction of the metal material, a second end portion situated on a downstream end of the flowing direction of the metal material, and an injection portion formed on the first end portion where said plurality of gates of the metal die are situated, forming a space between the first end portion and the injection portion;

covering the injection portion of the support wall by a synthetic-resin made cover; and fixing the cover to the support wall by a plurality of locations along the first edge portion to the third edge portion of the injection portion.

12. The method according to claim 11, wherein the metal material is a magnesium alloy.

* * * * *